United States Patent Office 3,533,749
Patented Oct. 13, 1970

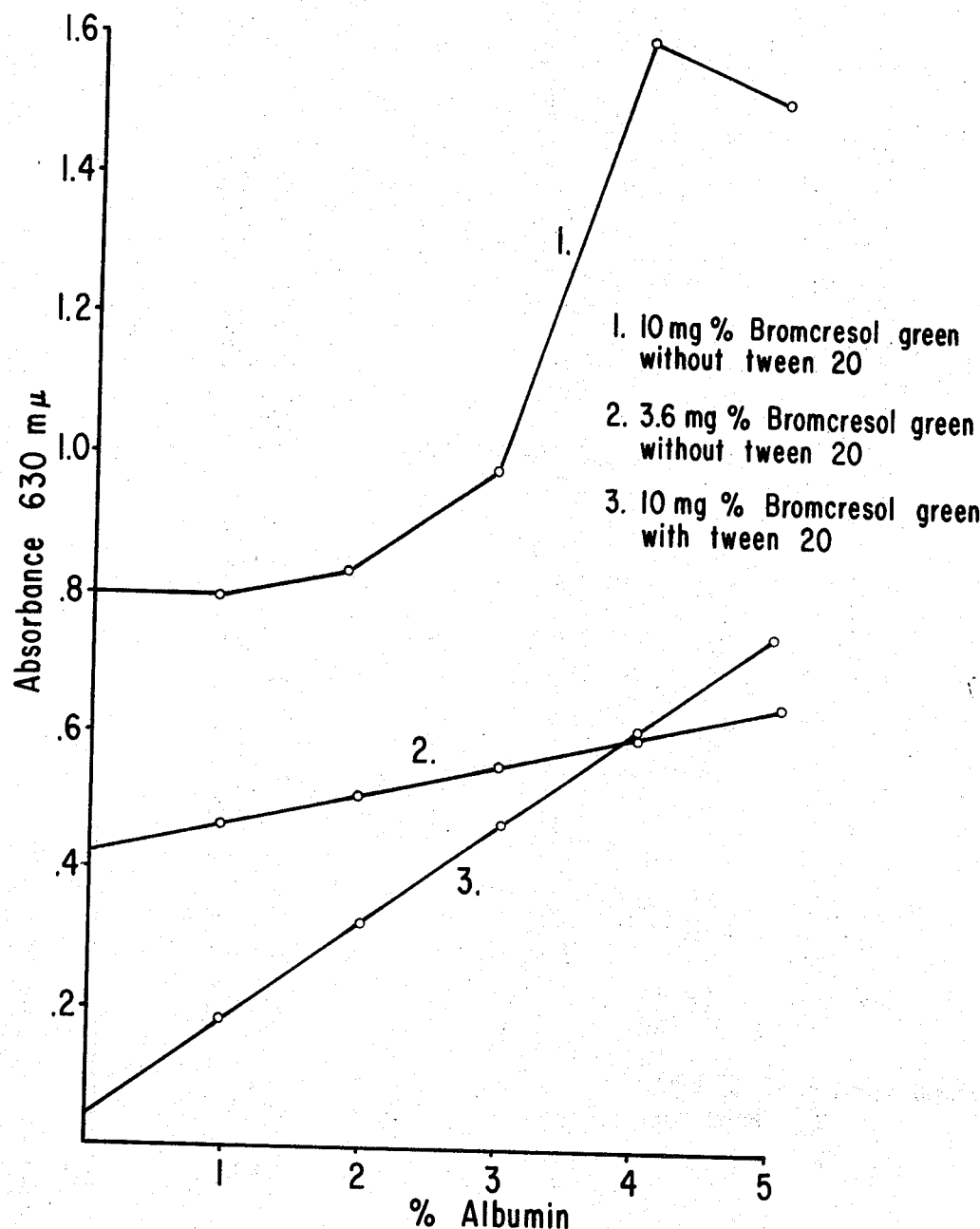

3,533,749
METHOD FOR THE DETERMINATION OF TOTAL ALBUMIN
Norman Kleinman, Rockaway, N.J., assignor to Warner-Lambert Pharmaceutical Company, Morris Plaines, N.J., a corporation of Delaware
Filed Sept. 12, 1967, Ser. No. 667,114
Int. Cl. G01m 21/24, 31/22, 33/16
U.S. Cl. 23—230    4 Claims

ABSTRACT OF THE DISCLOSURE

Serum albumin differs from other plasma proteins in its unusual affinity for numerous organic dyes. A simple rapid colorimetric assay for the direct determination of serum albumin is presented. When 20 µl. of serum is reacted with a chromogenic indicator such as bromcresol green in combination with non-ionic surface active agent in a buffer system having a pH 4, an increase in absorbance at 620–640 mµ is obtained. The increase in absorbance is directly proportional to the albumin concentration in the serum. The response is sensitive and linear to an albumin concentration as high as 6%.

---

This invention relates to a novel method for the determination of albumin in body fluids; and more particularly, to a novel method for the determination of albumin using as the albumin indicator bromcresol green or other sulponphthalein dyes in the presence of a small amount of non-ionic surface active agent.

The determination of total albumin content in serum is frequently performed in clinical laboratories. This determination is used for the detection of hypo-albuminemia as a cause of, or contributing factor in edema, and for evaluating the extent of protein depletion due to massive albuminuria, hemorrhage, transduation, malnutrition, neoplastic and other wasting diseases.

Numerous methods have been described for the determination of serum albumin. One of these methods is described by F. Lee Rodkey, Binding of Bromocresol Green by Human Serum Albumin and reported in the Archives of Biochemistry and Biophysics 108, 510–513 (1964). This method is based on the phenomenon that the absorbance of bromcresol green will be selectively diminished at its peak wavelength due to its affinity for albumin. The total albumin content is determined by the difference of absorbance with a diluted bromcresol green solution.

Other methods involving bromcresol green as an indicator have also been reported. For example: Gosslin, Can. J. Med., December 1966, p. 240, and Bartholomew, Proc. Australian Assoc. of Clin. Biochem. vol. No. 1, No. 7, p. 214 (1966). However these methods suffer from many disadvantages. One of the major disadvantages is that these methods lack sensitivity. Thus, in order to avoid turbidity of the reaction mixture which will interfere with the optical determinations, they must use sub-optimal bromcresol green concentrations. As a result of the use of sub-optimal concentrations of bromcresol green, much of the albumin in the sample remains unreacted. Obviously since there is unreacted albumin the test is not sensitive at all. Additionally, in order to diminish the absorbency of the reagent blank, the buffer system is employed at a sub-optimal pH.

Accordingly, a primary object of this invention is to provide for an improvement in the bromcresol green method for the determination of total serum albumin.

Another object of this invention is to provide a direct method for the determination of total serum albumin.

Another object of this invention is to provide a method for the determination of total serum albumin using bromcresol green or other sulphonphthalein dye as an indicator, but which will have increased sensitivity.

Yet, another object of this invention is to provide a method for the determination of total serum albumin, using bromcresol green or other sulphonphthalein dye as the indicator, whereby the response may be determined in a linear fashion.

Yet, another object of this invention is to provide an improvement in the bromcresol green method for the determination of total serum albumin, whereby the turbidity problem is entirely eliminated.

Other objects and advantages of this invention will become more apparent from the following detailed description.

It has been found that the sensitivity of bromcresol green as an indicator for albumin in body fluids is maximum at pH 4.0. A concentration of 10 mg. percent bromcresol green in the reaction mixture is necessary to obtain a linear response directly proportional to albumin concentrations up to 6%. At this concentration however the protein-dye complex will rapidly precipitate out of solution. In addition, the absorbance of the reagent indicator will be greater than the change in absorbance obtained with normal levels of serum albumin.

I have found that the inclusion of a small quantity of a non-ionic surface active agent or a mixture of different surface active agents prevent the protein-dye complex from precipitating out of solution thereby eliminating the problem of turbidity. In addition, a marked reduction in the observed absorption of the reagent blank is also obtained. The desirable result is a remarkable improvement in the sensitivity and linearity of the assay. Thus when a body fluid sample containing albumin is added to the buffered indicator reagent system, the increase in absorbance at 620–640 mµ obtained is directly proportional to the concentration of the albumin added.

The dramatic changes in the sensitivity of this test are illustrated in the accompanying drawing. Referring now more specifically to the drawing, Graph 1 is obtained by plotting albumin concentration using 1.0 ml. of 50 mg. percent solution of bromcresol green as the reagent against optical absorbance. Graph 2 is obtained in a similar manner, but employing 1.0 ml. of 18 mg. percent bromcresol green, a sub-optimal concentration of the reagent. Graph 3 is also obtained in a similar manner, as 1 but employing 1.0 ml. of bromcresol green at a concentration of to 50 mg. percent which is, of course, the optimal concentration to bromcresol green and a small amount of a surface active agent in the form of Tween 20. It is readily apparent that Graph 3 which embodies my invention is most sensitive and bears a direct relation between optical absorbance and alumin concentration.

Broadly speaking, this invention is practiced by dissolving bromcresol green in a suitable concentrated buffer system which will give a final pH of about 4 and a dye concentration of about 50 mg. percent or 0.05% by weight.

Suitable buffer systems are, for example, citric acid-sodium citrate, lactic acid-sodium lactate, phosphoric acid-sodium phosphate, acetic acid-sodium acetate, etc. These buffers are well known in the art and may be prepared in accordance with that described by Henry in "Clinical Chemistry."

A small amount such as from 0.1% to 1% by weight or by volume of non-ionic surface active agent either alone or in combination with another surface active agent is then added to the bromcresol green solution.

In the determination of albumin, a small amount of serum or other sample such as from 0.01 to 0.1 ml., preferably 0.02 ml. is mixed with about 1 ml. of the bromcresol green solution of this invention. The system is then diluted, for example, with 4 ml. of water and the optical absorption is measured at a wavelength of 620 mµ to 640 mµ. Absorbance of the reagent is measured in the absence of serum or sample. The difference in the optical absorbance gives a direct indication of the total concentration of albumin in the sample.

Exemplary of the usrface active agents which may be used in this invention are, nonyl-phenyl-polyethylene glycol ether, available under the tradename Tergitol; polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, available under the tradename of Tween, e.g. Tween 20, Tween 21, Tween 40, Tween 60, Tween 80, etc., sodium salt of alkylaryl polyether sulfate, modified phthalic glycerol alkyl resin, alkylaryl polyether, available under the tradename Triton, ethoxylated castor oil, ethoxylated cetyl/stearyl alcohol, ethoxylated oleic acid, polyethylene glycol fatty esters, ethovylated lauryl alcohol, ethoxylated myristyl alcohol, polyethylene glycol (400) monopalmitate, polyethylene glycol fatty ester, ethoxylated tridecyl alcohol, available under the tradename Lipal, e.g. Lipal 9C, Lipal 15CSA, Lipal 30 E, Lipal 4L, Lipal 4LA, Lipal 4MA, Lipal 4P, Lipal 15S, Lipal 6TD, polyoxyethylene lauryl ether, polyoxyethylene lauryl ether, polyoxyethylene cetyl ether, polyoxyethylene oleyl ether, polyoxyethylene oleyl ether, available under the tradename Brij, e.g. Brij 30, Brij 35, Brij 58, Brij 92, Brij 96, or any other non-ionic surface active agents, for example those disclosed in Detergents and Emulsifiers, 1964, published by John W. McCutcheon, Inc., Morristown, N.J.

The following examples are included in order further to illustrate the invention.

EXAMPLE 1

Preparation of the bromcresol green reagent 50 mg. of bromcresol green is dissolved in 100 ml. of a 0.1 molar lactic acid-sodium lactate buffer having a pH of 4.0. To this solution is added 1 ml. of polyoxyethylene sorbitan monolaurate available under the tradename Tween 20, from Atlas Chemical Co., Ltd.

EXAMPLES 2

0.02 ml. of serum containing an unknown amount of serum albumin is mixed with 1 ml. of the reagent prepared in accordance with Example 1. The resulting solution is then mixed with 4 ml. of water. The optical absorbance of this solution is then read at a wavelength of 630 mµ. Similarly, the optical absorbance is measured for the reagent without the serum. The difference between the two systems is directly proportional to the albumin between the two systems is directly proportional to the albumin concentration in the serum.

It is understood that the foregoing detailed description is given merely by way of illustration and that many variations may be made therein without departing from the spirit of my invention.

Having described my invention, what I desire to secure by Letters Patent is:

1. A spectrophotometric method for the determination of the total albumin in a sample which comprises contacting a small amount of said sample with a solution containing a known concentration of bromcresol green and a small amount of a non-ionic surface active agent, and reading the optical absorbance at a wavelength of 620 to 640 mµ of the resulting system, against that produced by a system formed by a solution of the same concentration of bromcresol green and the same amount of the same non-ionic surface active agent.

2. A method according to claim 1 wherein said non-ionic surface active agent is polyoxyethylene sorbitan monolaurate.

3. A spectrophotometric method for the determination of the total albumin in a sample which comprises contacting about 0.02 ml. of said sample with 1 ml. of a 0.05% by weight solution of bromcresol green in the presence of a small amount of non-ionic surface active agent, diluting the resulting solution with about 4 ml. of water and reading the optical density of the resulting system against that produced by 1 ml. of 0.05% of solution of bromcresol green in the presenec of a small amount of non-ionic surface active agent and 4 ml. of water at a wavelength of 620 mµ to 640 mµ.

4. A method according to claim 3 wherein said non-ionic surface active agent is polyoxyethylene sorbitan monolaurate.

References Cited

UNITED STATES PATENTS 3,359,072  12/1967  Rey et al.
3,418,079  12/1968  Rey et al.

OTHER REFERENCES

E. Haack et al.: Chemical Abstracts, vol. 63, p. 916 (1965).

F. L. Rodkey: Clinical Chemistry, vol. 11, No. 4, pp. 478–87 (1965).

JOSEPH SCOVRONEK, Primary Examiner

A. KATZ, Assistant Examiner

U.S. Cl. X.R.

252—408